(12) United States Patent
Ekambaram et al.

(10) Patent No.: US 10,169,189 B2
(45) Date of Patent: Jan. 1, 2019

(54) FUNCTIONAL TEST AUTOMATION OF MOBILE APPLICATIONS INTERACTING WITH NATIVE STOCK APPLICATIONS

(71) Applicant: International Business Machines Corporation, Armonk, NY (US)

(72) Inventors: Vijay Ekambaram, Chennai (IN); Ashish K. Mathur, Bangalore (IN); Vivek Sharma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 14/851,862

(22) Filed: Sep. 11, 2015

(65) Prior Publication Data

US 2017/0075786 A1 Mar. 16, 2017

(51) Int. Cl.
*G06F 11/36* (2006.01)
*G06F 11/34* (2006.01)

(52) U.S. Cl.
CPC .......... *G06F 11/3608* (2013.01); *G06F 11/34* (2013.01); *G06F 11/3668* (2013.01); *G06F 11/3684* (2013.01); *G06F 11/3688* (2013.01)

(58) Field of Classification Search
CPC ............. G06F 11/3688; G06F 11/3664; G06F 11/3684; G06F 11/3888; G06F 11/3636
See application file for complete search history.

(56) References Cited

U.S. PATENT DOCUMENTS

| 7,653,896 | B2 | 1/2010 | Herdeg, III | |
| 9,280,452 | B1* | 3/2016 | Mahadevan | G06F 11/3684 |
| 2011/0320879 | A1 | 12/2011 | Singh et al. | |
| 2012/0198279 | A1 | 8/2012 | Schroeder | |
| 2012/0210209 | A1* | 8/2012 | Biddle | G06F 11/3688 715/234 |
| 2013/0078983 | A1 | 3/2013 | Doshi et al. | |
| 2013/0179585 | A1* | 7/2013 | Branson | H04L 65/608 709/231 |
| 2014/0047413 | A1* | 2/2014 | Sheive | H04L 65/403 717/110 |
| 2014/0089904 | A1* | 3/2014 | Wray | G06F 11/3672 717/135 |
| 2014/0237455 | A1 | 8/2014 | Koneru et al. | |

(Continued)

OTHER PUBLICATIONS

Selvam et al "Mobile Software Testing—Automated Test Case Design Strategies." International Journal on Computer Science and Engineering 3.4, 2011, pp. 1450-1461. Retrieved on [Aug. 23, 2018] Retrieved from the Internet:URL<http://www.enggjournals.com/ijcse/doc/IJCSE11-03-04-014.pdf> (Year: 2011).*

(Continued)

*Primary Examiner* — Thuy Dao
*Assistant Examiner* — Cheneca Smith
(74) *Attorney, Agent, or Firm* — David B. Woycechowsky; Maeve L. Carpenter

(57) ABSTRACT

In an approach to test automation of an application under test which interacts with one or more native stock applications, a computer identifies one or more native stock applications on a mobile computing device. The computer then dumps a view hierarchy for each of the one or more native stock applications. The computer generates, based, at least in part, on the view hierarchy, a template table for each of the one or more native stock applications.

12 Claims, 4 Drawing Sheets

(56) References Cited

U.S. PATENT DOCUMENTS

2015/0046909 A1* 2/2015 Ligman ............... G06F 11/3688
                                                      717/131
2016/0132423 A1* 5/2016 Allen ................. G06F 11/3684
                                                      714/38.1

OTHER PUBLICATIONS

Griebe et al "A model-based approach to test automation for context-aware mobile applications." Proceedings of the 29th Annual ACM Symposium on Applied Computing. ACM, 2014. Retrieved on [Aug. 23, 2018] Retrieved from the Internet: URL<https://dl.acm.org/citation.cfm?id=2554942> (Year: 2014).*

Gomez et al.; "RERAN: Timing- and Touch-Sensitive Record and Replay for Android"; IEEE; © 2013, IEEE;ICSE 2013, May 18, 2013, San Francisco, CA, USA; pp. 72-81.

Hodgson, Pete; "Using the UIAutomation Private Framework"; Being Agile; Posted by: Pete Hodgson; Jul. 11, 2012; Copyright © 2014—Pete Hodgson; pp. 1-5; <http://blog.thepete.net/blog/2012/07/11/using-the-uiautomation-private-framework/>.

Song et al.; "An Integrated Test Automation Framework for Testing on Heterogeneous Mobile Platforms"; IEEE; 2011 First ACIS International Symposium on Software and Network Engineering; © 2011, IEEE, Dec. 19, 201, pp. 141-145.

Thakkar, Mehul; "UIAutomation by using Private Framework"; Blog Spot; Mar. 2, 2014; Printed on: May 6, 2015; pp. 1-5; <http://mehulthakkar.blogspot.in/>.

"Introduction to Appium's Philosophy, Design and Concepts"; Appium; Printed on: May 6, 2015; pp. 1-3; <http://appium.io/introduction.html>.

* cited by examiner

FUNCTIONAL TEST AUTOMATION OF MOBILE APPLICATIONS INTERACTING WITH NATIVE STOCK APPLICATIONS

BACKGROUND OF THE INVENTION

The present invention relates generally to the field of mobile application software testing and more particularly to functional test automation of mobile applications interacting with native stock applications.

Mobile application development is a process by which application software is developed for handheld devices, such as personal digital assistants, enterprise digital assistants, mobile phones (e.g., smartphones), tablet computers, and the like. Mobile applications (e.g., "apps") can be pre-installed on devices during manufacturing, downloaded by customers from various mobile software distribution platforms, or delivered as web applications using server-side or client-side processing to provide an application-like experience within a web browser.

An application developer typically tests an application before releasing the application to the end user. Testing may be used to find and fix errors in an application so that, once released, the end user has a positive user experience when using the application. Functional testing provides testers with the ability to validate expected navigation and behaviors of the application. Functional testing can monitor the behavior of the application to ensure the application displays the correct outputs, navigates correctly, and correctly responds to swipes, taps, inputs and other gestures, for example. In this manner, functional testing tests the inputs and outputs of the application from the 'glass' or screen perspective of the mobile device on which the application is run.

The ability to record and playback a user's interaction with a computer has the potential to benefit multiple parties, including businesses, users, software developers, testers, and computer support personnel. For example, software developers can use the ability to record user actions to help generate test cases for software under development, and testers can use record and playback tools to build tests to perform automated regression testing. A challenge in record-and-playback testing systems can occur with accurately recording an app's execution in order to support automatic replay.

SUMMARY

Embodiments of the present invention disclose a method, a computer program product and a computer system for test automation of an application under test which interacts with one or more native stock applications. The method includes identifying, by one or more computer processors, one or more native stock applications on a mobile computing device. The method then includes dumping, by one or more computer processors, a view hierarchy for each of the one or more native stock applications. The method includes generating, by one or more computer processors, based, at least in part, on the view hierarchy, a template table for each of the one or more native stock applications.

DETAILED DESCRIPTION

Native stock applications are the system applications and services that are packaged with an operating system (OS) for a mobile computing device, for example, contacts, settings, camera, weather, and clock. Functional test automation of mobile applications that interact with native stock applications on a mobile computing device can be difficult due to the fact that native stock applications are non-instrumented applications. Functional test automation refers to the reliable record and playback of a test case of an application under test (AUT). Embodiments of the present invention recognize that native stock applications have common templates and common functionalities, thereby allowing correlation between a view hierarchy of a native stock application with its standard functionalities. Embodiments of the present invention recognize that generating a table of the correlated information may accelerate the record and playback process of functional test automation.

Figure 1:
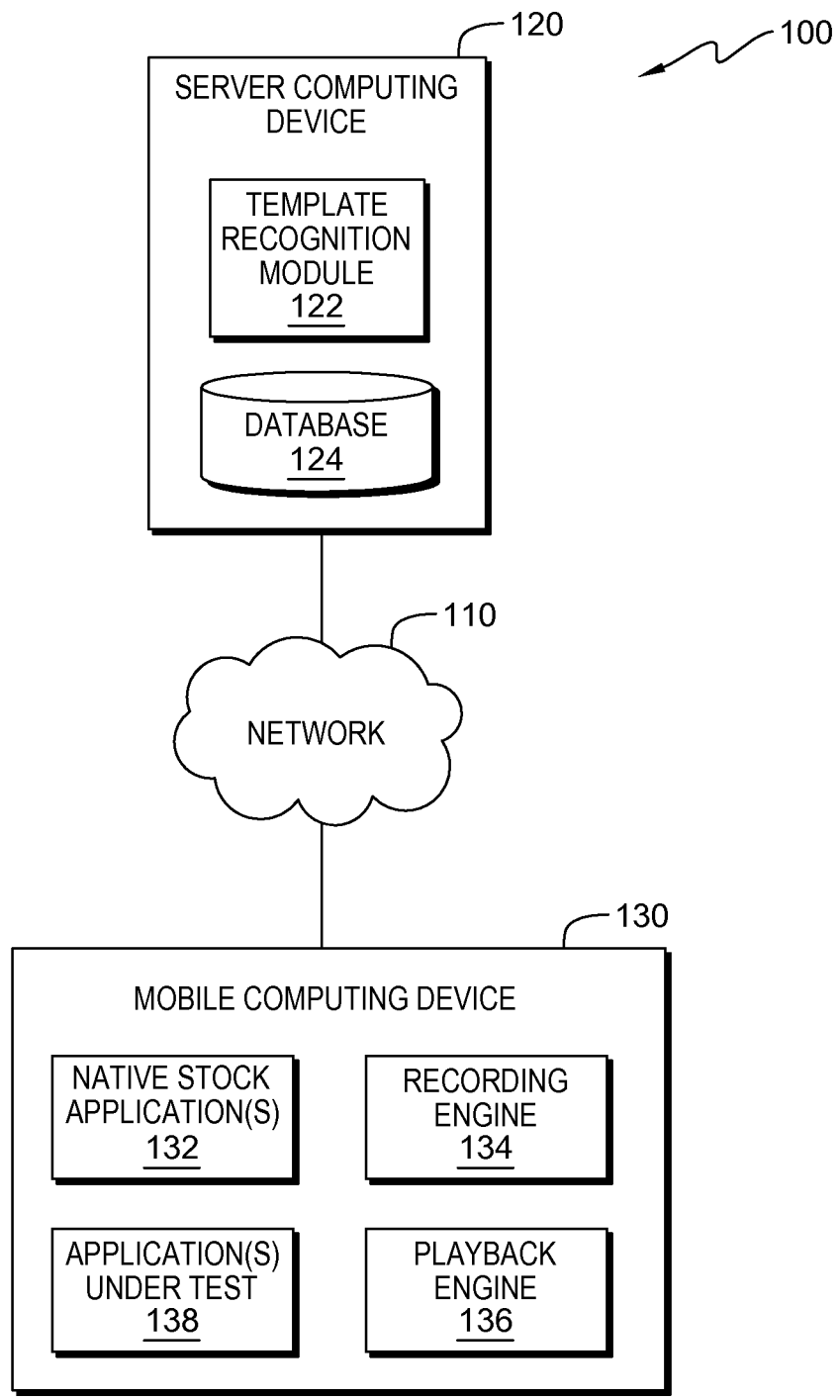
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. In embodiments of the present invention, data processing environment 100 represents a functional test automation environment, including a mobile application to be tested, such as one or more of application(s) under test 138 on mobile computing device 130. FIG. 1 provides only an illustration of one implementation and does not imply any limitations with regard to the environments in which different embodiments may be made by those skilled in the art without departing from the scope of the invention as recited by the claims.

Data processing environment 100 includes server computing device 120 and mobile computing device 130, interconnected via network 110. Network 110 can be, for example, a telecommunications network, a local area network (LAN), a wide area network (WAN), such as the Internet, or a combination of the three, and can include wired, wireless, or fiber optic connections. Network 110 may include one or more wired and/or wireless networks that are capable of receiving and transmitting data, voice, and/or video signals, including multimedia signals. In general, network 110 can be any combination of connections and protocols that will support communications between server computing device 120, mobile computing device 130, and other computing devices (not shown) within data processing environment 100.

In various embodiments, server computing device 120 can be a standalone computing device, a management server, a web server, a mobile computing device, or any other electronic device or computing system capable of receiving, sending, and processing data. In other embodiments, server computing device 120 can represent a server computing system utilizing multiple computers as a server system. In another embodiment, server computing device can be a laptop computer, a tablet computer, a netbook computer, a personal computer, a desktop computer, or any programmable electronic device capable of communicating with other computing devices (not shown) within data processing environment 100 via network 110. In another embodiment, server computing device 120 represents a computing system utilizing clustered computers and components (e.g., database server computers, application server computers, etc.) that act as a single pool of seamless resources when accessed within data processing environment 100. Server computing device 120 includes template recognition module 122 and database 124. In various embodiments, each of the programs, modules, and/or database included on server computing device 120 may be located elsewhere within data processing environment 100 with access to data and information for implementation of the present invention via network 110. Server computing device 120 may include internal and external hardware components, as depicted and described with respect to computer system 400 of FIG. 4.

Template recognition module 122 performs functional test automation on mobile applications under test that interact with native stock applications, including record and playback of a test case on an application under test ("AUT"), for example, application(s) under test 138. An AUT is an application that is designed and coded, and has reached a testing phase. In performing testing on an AUT that interacts with native stock applications, template recognition module 122 identifies one or more native stock applications on a mobile computing device, for example, mobile computing device 130, and dumps a view hierarchy of each native stock application. Template recognition module 122 generates a template table, based on the view hierarchies of each native stock application, independent of the operating system ("OS") on the mobile computing device. During testing, template recognition module 122 records each test step, and during playback, the module performs reverse lookup for coordinates for the test step, using the generated template table. Template recognition module 122 then passes the coordinates on to the playback engine. In various embodiments of the present invention, template recognition module 122 can reside and operate on mobile computing device 130.

Database 124 resides on server computing device 120. A database is an organized collection of data. Database 124 can be implemented with any type of storage device capable of storing data that can be accessed and utilized by server computing device 120, such as a database server, a hard disk drive, or a flash memory. In other embodiments, database 124 can represent multiple storage devices within data processing environment 100 or within server computing device 120. Database 124 can store templates generated by template recognition module 122 for each mobile computing device 130 for use with operation of template recognition module 122. Database 124 may also store other test case and analysis information used by a software tester or developer in testing mobile applications in data processing environment 100.

In various embodiments of the present invention, mobile computing device 130 can be a tablet computer, a smartphone, a personal digital assistant (PDA), a wearable computing device, or any mobile programmable electronic device capable of communicating with various components and devices within data processing environment 100 via network 110. A wearable computing device may be a miniature electronic device that can be worn by the bearer under, with, or on top of clothing, as well as in glasses, hats, or other accessories. Wearable computing devices are especially useful for application that require more complex computing support than hardware coded logics. In general, mobile computing device 130 represents any programmable electronic device or combination of programmable electronic devices capable of executing machine readable program instructions and communicating with other computing devices (not shown) within data processing environment 100 via a network, such as network 110. Mobile computing device 130 includes native stock application(s) 132, recording engine 134, playback engine 136, and application(s) under test 138.

Native stock application(s) 132 are one or more of a plurality of application software, typically mobile application software that is developed for use on a particular platform or device and are typically packaged with a particular OS and installed directly on a mobile computing device, such as mobile computing device 130. Native stock application(s) 132 have the ability to use device specific hardware and software, and data associated with the application(s) can be stored on the device, or remotely and accessed by the application(s).

Recording engine 134 performs recording functions during test of an application under test known to those skilled in the art. For example, recording engine 134 records user interaction with an application under test, for example, a user installed application and records data regarding interaction between the user installed application and a native stock application in a template table. Playback engine 136 performs operations and functions of playback known to those skilled in the art during playback of an application under test. For example, playback engine 136 retrieves information from the template table using reverse lookup when the playback reaches a step corresponding to the recorded event data. In various embodiments of the present invention, each of the functions and operations of recording engine 134 and playback engine 136 may be performed by template recognition module 122, or at the direction and instruction of template recognition module 122.

Application(s) under test ("AUT") 138 are one or more of a plurality of mobile application software, i.e., apps, which are computer programs typically designed to run on smart phones, tablet computers, and other mobile devices, and are installed by a user on mobile computing device 130. AUT 138 may interact with native stock application(s) 132, for example, a group chat mobile application downloadable from an application store or software distribution platform may utilize a camera native stock application from within the group chat mobile application. AUT 138 is an application(s) on which template recognition module 122 is recording and playing back a test case.

Figure 2:
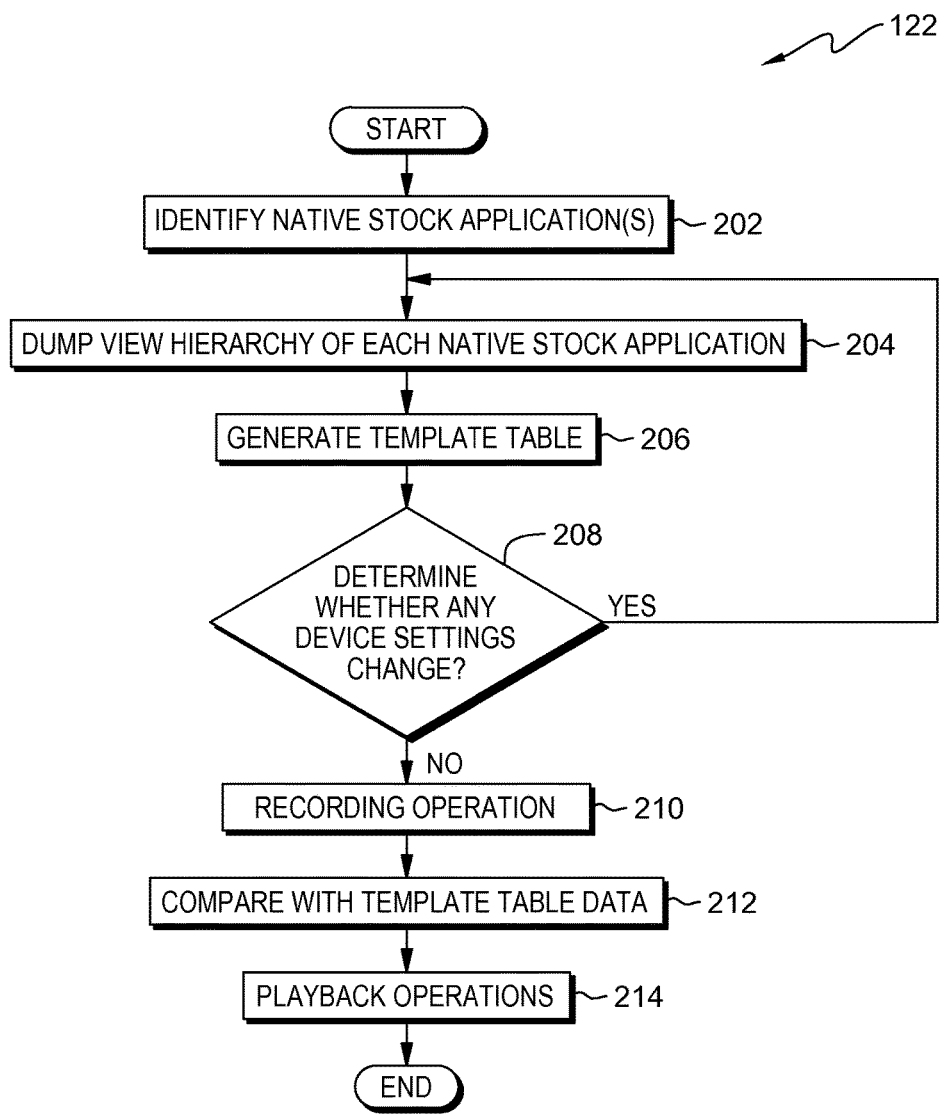
FIG. 2 is a flowchart depicting operational steps of a template recognition module, for generating a template table for native stock applications for use in functional test automation, in accordance with an embodiment of the present invention.

FIG. 2 is a flowchart depicting operational steps of template recognition module 122, for generating a template table for native stock applications for use in functional test automation, in accordance with an embodiment of the present invention.

Template recognition module 122 identifies native stock application(s) on the mobile computing device (step 202). Template recognition module 122 determines, for example, by querying the mobile computing device 130, which, if any, native stock applications are present on the device.

Template recognition module 122 dumps a view hierarchy of each native stock application (step 204). A view hierarchy defines the relationship of views in a window or display to each other. The view hierarchy may be in a tree structure, and include views structurally specified by parent-child relationships. Using, for example, a hierarchy viewer, template recognition module 122 dumps each view hierarchy associated with a native stock application on the mobile computing device. In various embodiments, retrieving the view hierarchy of each native stock application is independent of any operating system installed on the mobile computing device.

Template recognition module 122 generates a template table (step 206). In embodiments of the present invention, the view hierarchy is parsed to automatically update the template table. The generated template table is specific to the mobile computing device in which the view hierarchy was dumped, for example, mobile computing device 130. The template table is therefore generated for each device, and populated for each native stock application on the device before testing of an AUT begins, for example, testing of AUT 138. The template table is maintained for each native stock application installed on the device. The template table contains information and data on the device, including for example the type of device and an orientation of the device, the operating system and version on the device, and information on the native stock application, such as name, activity, action, and bounding coordinates of any features of the native stock application. A feature may be a widget, such as a button or onscreen option to select an item, and the coordinates for the feature may include both coordinates for a portrait orientation of the device and a landscape orientation. In an example, an AUT utilizes a camera, which is a native stock application on a specific mobile device. The information and data populating the template table include the "app name" camera, the "feature type" button, and "feature action" capture. Also included in the template table might be coordinates of the feature on the device, such as the location of the capture button on the camera application. Template recognition module 122 utilizes the template table for functional test automation of an application under test, when such application under test interacts with one or more native stock application on the mobile computing device, independent of an operating system on the mobile computing device.

In an alternate embodiment, template recognition module 122 populates a template table at runtime during record and playback. In this embodiment, template recognition module 122 retrieves the view hierarchies of one or more native stock applications during the testing process and generates the template table during runtime, as required.

Template recognition module 122 determines whether any device settings of the mobile computing device changed (decision block 208). If at least one device setting of the mobile computing device change (decision block 208, "yes" branch), the view hierarchy information is retrieved and the template table is populated again with any updated information, such as an updated device setting (step 204). For example, if an updated version of an existing application or operating system of the device is made available, the device settings may change.

If no device settings change (decision block 208, "no" branch), template recognition module 122 enters a recording phase and performs recording operations, for example, records event data of a user event (step 210). In an embodiment, template recognition module 122 retrieves data obtained by recording engine 134. Recording engine 134, as discussed above with reference to FIG. 1, records a user interaction event with the AUT 138 and the AUT 138 interaction with native stock application(s) 132, for example, a user click on a "capture" button of a camera application accessed within an AUT, such as a group chat application. Template recognition module 122 records the user event, such as "press at pixel 360, 1200 and release at pixel 360, 1200".

Template recognition module 122 compares the user event data with the template table data (step 212). Template recognition module 122 compares the recorded user event, with the generated template table, and records the user event as a test step, for example, "click on capture button". In embodiments of the present invention, the test step information is included in the template table. In various embodiments, the template table may contain information, such as coordinates of application features, in a generic format, and template recognition module 122 converts the recorded information to the table format, for example, converting pixel data to coordinate data.

Template recognition module 122 enters a playback phase and performs playback operations, for example, by performing reverse lookup during playback of the application under test (step 214). Using the test case attributes, such as action, label, etc., and metadata, such as device, application, activity, etc., template recognition module 122 performs a reverse lookup for pixel coordinates, so that a coordinate, action pair, i.e., [(x,y), action], is passed on to the playback engine. For example, during playback, such as through the operation of playback engine 136, when the playback engine reaches the user event camera step, playback engine 136 reads Test Step "click button 'capture'" from the template table. Template recognition module 122 performs reverse look up using the template table, to determine which widget on the camera native stock application is associated with a capture action. Template recognition module 122 provides the information from the template table to playback engine 136, which can then perform the tap, or other appropriate action on the determined widget. In various embodiments of the present invention, steps 202, 204, 206, and 208 can be performed on a mobile computing device, and the information can be retrieved by template recognition module 122 via network 110.

Figure 3:
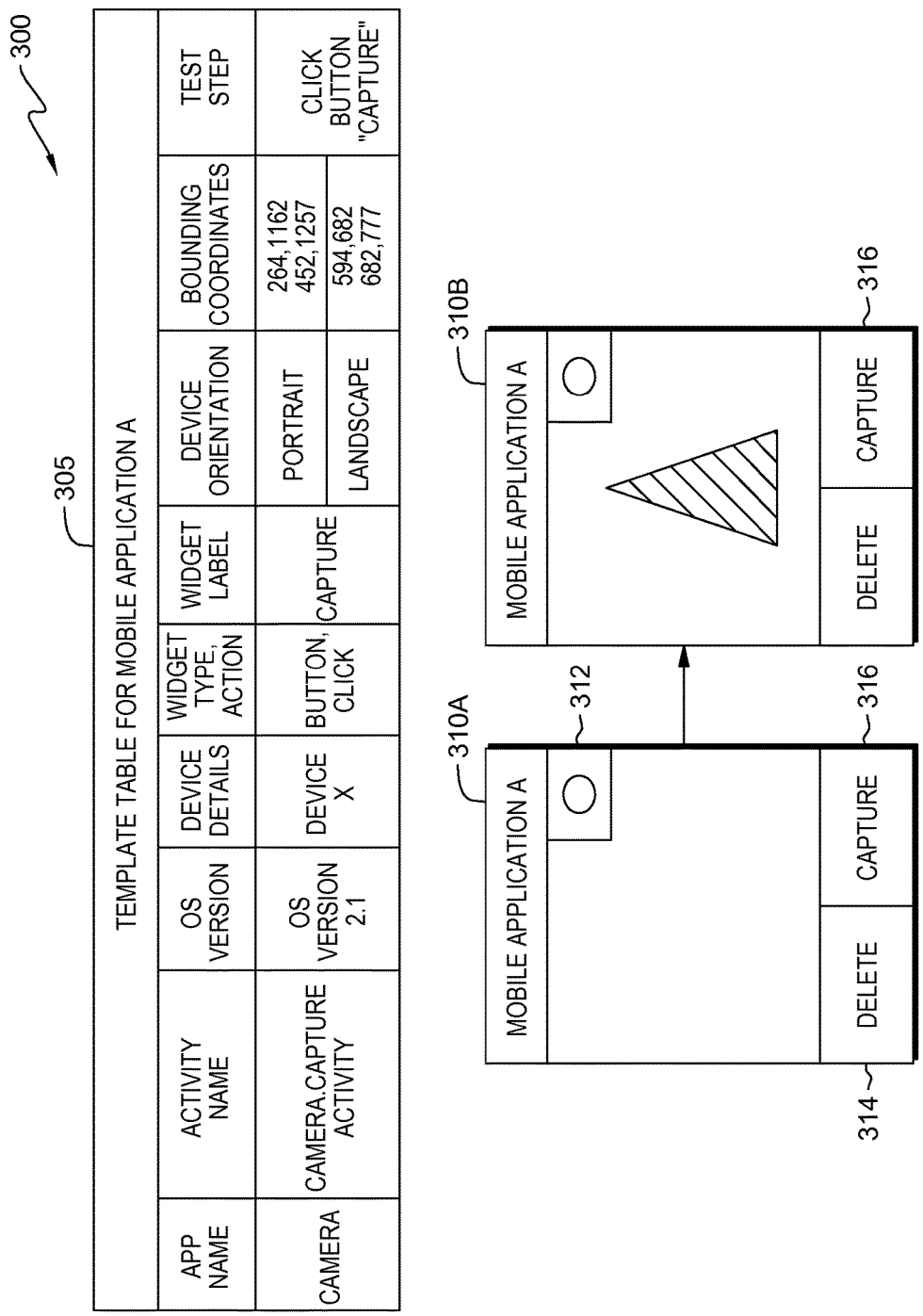
FIG. 3 illustrates a flow diagram depicting an exemplary operation of the template recognition module of FIG. 2, in accordance with an embodiment of the present invention.

FIG. 3 illustrates an exemplary flow diagram 300 depicting operation of template recognition module 122, in accordance with an embodiment of the present invention.

Flow diagram 300 depicts template table 305, which includes information gathered from a dump of the view hierarchy of mobile application A, as discussed above with reference to step 204. The view hierarchy information can include information such as an OS version, device details, widget type and/or action, widget label, device orientation and coordinates of the widget based corresponding to the device orientation. Template table 305 includes recorded event data, recorded in conjunction with operation of recording engine 134, for example, test step "click button 'capture'", such as discussed with reference to steps 210 and 212. Flow diagram 300 also depicts mobile computing device 310A, including mobile application A. When a user selects camera 312, a native stock application on mobile computing device 310A, within mobile application A, options delete 314 and capture 316 are available. When the user elects to use camera 312 within mobile application A, the AUT, here mobile application A, is no longer in control, instead the native stock application is operating within the AUT.

Mobile computing device 310B depicts mobile application A after a user has selected capture 316. Template recognition module 122 records the capture event of 310B, as test step "click button 'capture'" in template table 305, compares the recorded information to the data in template table 305, and provides the recorded event information during playback of the test case.

Figure 4:
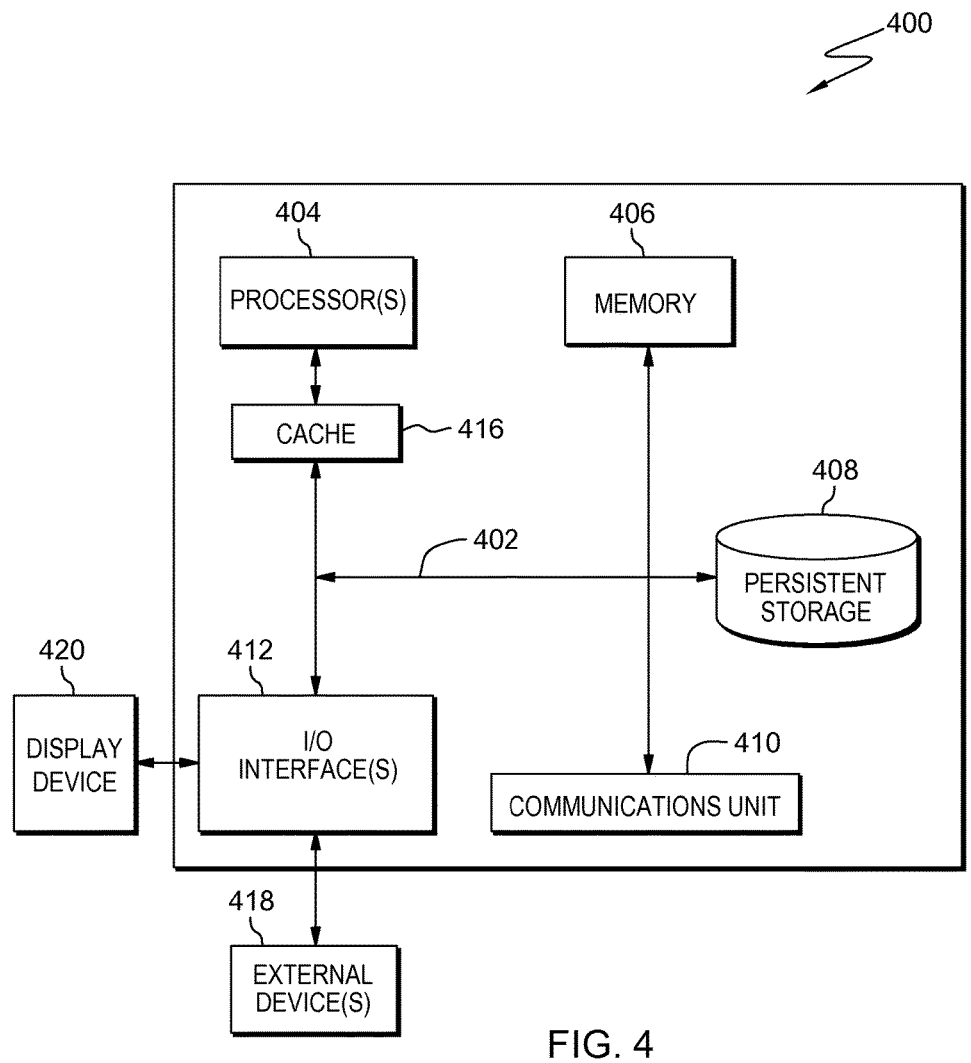
FIG. 4 is a block diagram of components of a data processing system, such as the server computing device of FIG. 1, in accordance with an embodiment of the present invention.

FIG. 4 depicts a block diagram of components of a computer system 400, which is an example of a system such as server computing device 120 of FIG. 1, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made. In embodiments where template recognition module 122 and other programs, modules, or databases needed for operation of the invention are located on mobile computing device 130, the block diagram of components of a computer system 400 may describe components of mobile computing device 130.

Server computing device 120 includes computer processors(s) 404, cache 416, memory 406, persistent storage 408, communications unit 410, input/output (I/O) interface(s) 412, and communications fabric 402. Communications fabric 402 provides communications between cache 416, memory 406, persistent storage 408, communications unit 410, and I/O interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 416 is a memory that enhances the performance of processor(s) 404 by storing recently accessed data, and data near recently accessed data, from memory 406.

Program instructions and data used to practice embodiments of the present invention can be stored in persistent storage 408 for execution and/or access by one or more of the respective computer processor(s) 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices within data processing environment 100. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to server computing device 120. For example, I/O interface(s) 412 may provide a connection to external device(s) 418 such as a keyboard, a keypad, a touch screen, and/or some other suitable input device. External device(s) 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used, for example, in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
receiving, by one or more computer processors, a first view hierarchy data set including information indicative of a first view hierarchy for a first native stock application, with the first native stock application being a system application that is packaged with an operating system (OS) for a first type of mobile computing device, and with the first view hierarchy being data organized into a tree structure that defines relationships among and between views generated by the first native stock application including views structurally specified by parent-child relationships;
generating, by one or more computer processors, based, at least in part, on the first view hierarchy data set, a template table for the first native stock application, with the template table including an identification of the type of first type of mobile computing device, a set of possible orientation(s) of the first type of mobile computing device, an identification of the OS, an identification of a version on the first type of mobile computing device, name of the first native stock application, activity information of the first native stock application, action information for the first native stock application, and bounding coordinates for each feature of a set of feature(s) of the first native stock application; and
performing automated testing of a first application under test (AUT) using the template table.

2. The method of claim 1 wherein the set of feature(s) includes a first feature in the form of a widget that is a button or onscreen option to select an item when using the first native stock application.

3. The method of claim 2 wherein bounding coordinates of the first feature include both bounding coordinates for a portrait orientation of the first type of mobile device and a landscape orientation of the first type of mobile device.

4. The method of claim 1 wherein the performance of the automated testing of the first AUT includes:
  determining that a set of device settings(s) of the first type of mobile computing device have changed during automated testing;
  responsive to the determination that a set of device setting(s) have changed, retrieving the view hierarchy information is retrieved; and
  further responsive to the determination that a set of device setting(s) have changed, re-populating the template table with updated information.

5. A computer program product comprising:
  a machine readable storage device; and
  computer code stored on the machine readable storage device, with the computer code including instructions for causing a processor(s) set to perform operations including the following:
    receiving, by one or more computer processors, a first view hierarchy data set including information indicative of a first view hierarchy for a first native stock application, with the first native stock application being a system application that is packaged with an operating system (OS) for a first type of mobile computing device, and with the first view hierarchy being data organized into a tree structure that defines relationships among and between views generated by the first native stock application including views structurally specified by parent-child relationships,
    generating, by one or more computer processors, based, at least in part, on the first view hierarchy data set, a template table for the first native stock application, with the template table including an identification of the type of first type of mobile computing device, a set of possible orientation(s) of the first type of mobile computing device, an identification of the OS, an identification of a version on the first type of mobile computing device, name of the first native stock application, activity information of the first native stock application, action information for the first native stock application, and bounding coordinates for each feature of a set of feature(s) of the first native stock application, and
    performing automated testing of a first application under test (AUT) using the template table.

6. The computer program product of claim 5 wherein the set of feature(s) includes a first feature in the form of a widget that is a button or onscreen option to select an item when using the first native stock application.

7. The computer program product of claim 6 wherein bounding coordinates of the first feature include both bounding coordinates for a portrait orientation of the first type of mobile device and a landscape orientation of the first type of mobile device.

8. The computer program product of claim 5 wherein the performance of the automated testing of the first AUT includes:
  determining that a set of device settings(s) of the first type of mobile computing device have changed during automated testing;
  responsive to the determination that a set of device setting(s) have changed, retrieving the view hierarchy information is retrieved; and
  further responsive to the determination that a set of device setting(s) have changed, re-populating the template table with updated information.

9. A computer system comprising:
  a processor(s) set;
  a machine readable storage device; and
  computer code stored on the machine readable storage device, with the computer code including instructions for causing the processor(s) set to perform operations including the following:
    receiving, by one or more computer processors, a first view hierarchy data set including information indicative of a first view hierarchy for a first native stock application, with the first native stock application being a system application that is packaged with an operating system (OS) for a first type of mobile computing device, and with the first view hierarchy being data organized into a tree structure that defines relationships among and between views generated by the first native stock application including views structurally specified by parent-child relationships,
    generating, by one or more computer processors, based, at least in part, on the first view hierarchy data set, a template table for the first native stock application, with the template table including an identification of the type of first type of mobile computing device, a set of possible orientation(s) of the first type of mobile computing device, an identification of the OS, an identification of a version on the first type of mobile computing device, name of the first native stock application, activity information of the first native stock application, action information for the first native stock application, and bounding coordinates for each feature of a set of feature(s) of the first native stock application, and
    performing automated testing of a first application under test (AUT) using the template table.

10. The computer system of claim 9 wherein the set of feature(s) includes a first feature in the form of a widget that is a button or onscreen option to select an item when using the first native stock application.

11. The computer system of claim 10 wherein bounding coordinates of the first feature include both bounding coordinates for a portrait orientation of the first type of mobile device and a landscape orientation of the first type of mobile device.

12. The computer system of claim 9 wherein the performance of the automated testing of the first AUT includes:
  determining that a set of device settings(s) of the first type of mobile computing device have changed during automated testing;
  responsive to the determination that a set of device setting(s) have changed, retrieving the view hierarchy information is retrieved; and
  further responsive to the determination that a set of device setting(s) have changed, re-populating the template table with updated information.

* * * * *